United States Patent [19]

Tatami

[11] 4,054,921
[45] Oct. 18, 1977

[54] AUTOMATIC TIME-BASE ERROR CORRECTION SYSTEM

[75] Inventor: Mitsushige Tatami, Tokyo, Japan
[73] Assignee: Sony Corporation, Tokyo, Japan
[21] Appl. No.: 578,869
[22] Filed: May 19, 1975
[51] Int. Cl.² .................. H04N 5/78; G11B 27/28
[52] U.S. Cl. .................................. 360/27; 360/36
[58] Field of Search ............... 360/9, 26, 27, 36, 51, 360/33; 178/DIG. 3, 69.5 TV, 69.5 DC; 358/8, 4, 148; 340/173 R; 179/100.1 R

[56] References Cited

U.S. PATENT DOCUMENTS

| | | | |
|---|---|---|---|
| 3,774,999 | 11/1973 | Ivestor et al. | 360/27 |
| 3,795,763 | 3/1974 | Golding et al. | 178/DIG. 3 |
| 3,831,189 | 8/1974 | Shenk et al. | 360/27 |
| 3,831,192 | 8/1974 | Gross et al. | 360/27 |
| 3,860,952 | 1/1975 | Tallent et al. | 360/36 |
| 3,909,839 | 9/1975 | Inaba et al. | 360/36 |
| 3,909,843 | 9/1975 | Wray | 360/27 |
| 3,931,638 | 1/1976 | Lentz | 360/36 |

OTHER PUBLICATIONS

Carr et al., MOS/LSI Design and Application, p. 209, 1972.
Skou et al., Buffer System, IBM Tech. Disc. Bulletin, vol. 2, No. 5, 2/60, pp. 86-89.

*Primary Examiner*—Raymond F. Cardillo, Jr.
*Attorney, Agent, or Firm*—Hill, Gross, Simpson, Van Santen, Steadman, Chiara & Simpson

[57] ABSTRACT

An automatic time-base error correction system having a pair of random access memories, in which an input signal including timing errors is written in one of the random access memories alternatively at a rate corresponding to the timing errors, and an output signal is alternatively read out from the memories at the constant rate.

7 Claims, 5 Drawing Figures

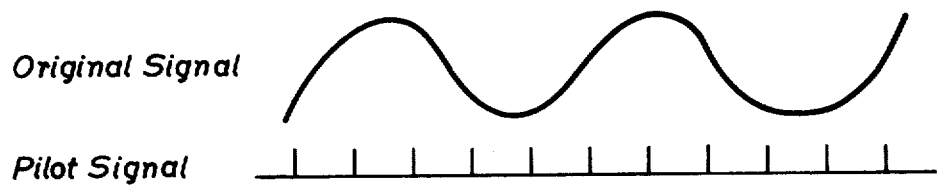
FIG. 1A
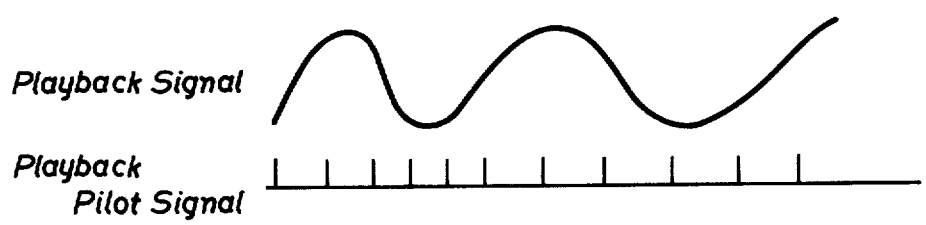
FIG. 1B
FIG. 3A
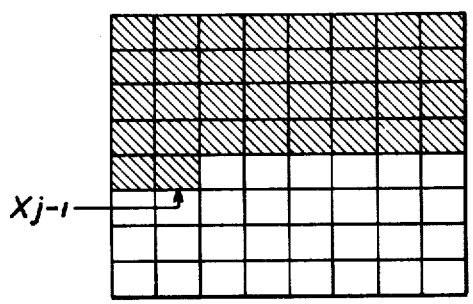
FIG. 3B
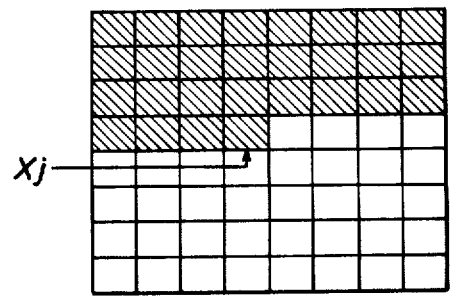

AUTOMATIC TIME-BASE ERROR CORRECTION SYSTEM

BACKGROUND OF THE INVENTION

1. Field of the Invention

This invention relates to an automatic time-base error correction system and in particular to an automatic time-base error correction system using a pair of random access memories.

2. Description of the Prior Art

Magnetic tape recorders, particularly video tape recorders, can yield distortions because of time-base errors in reproducing signals therefrom. These errors arise from various factors such as tape speed variations caused by high frequency components of flutter, tape expansion, variations of magnetic head rotation speed, and so on.

It is well known that the error can be corrected by using a variable delay line with feedback control. This method, however, is incapable of perfectly removing the time-base error in the input signal because of use of feedback control.

There is also known a system for correcting the time-base errors by using three or more shift-registers. According to this system, the output signal from shift-registers is read out at a uniform rate so that the time-base error can be corrected. The problem with this system is poor transfer efficiency in shift-registers, resulting in reduced level of output signal. Also, according to this system, the input signal is stored in portions corresponding to the bit number of each shift-register, so that if a large time-base error is included in the input signal, such error can not be corrected. Further, as shift-registers are used in large number, the control circuit is complicated.

SUMMARY OF THE INVENTION

The present invention is to provide an automatic time-base error correction system having a pair of random access memories (RAM), whereby the input signal sampled at a rate corresponding to the time-base error is written in one of the RAM'S while reading out the signal from the other RAM at a constant rate.

In this specification, the present invention is described by way of an embodiment where each random access memory stores digitalized signals. In case one word of digitalized signals consists of signals of $n$-bits, n random access storage elements are required for storing the bits of one word. But, in order to simplify the discussion, only one bit slice for each random access memory is here described in full detail representatively.

BRIEF DESCRIPTION OF THE DRAWINGS

FIG. 1A and 1B are charts showing waveforms of original signal, pilot signal playback signal and playback pilot signal used in the description of the present invention;

FIGS. 3A and 3B illustrate the principle of the present invention.

DESCRIPTION OF THE PREFERRED EMBDOIMENT

Figure 2:
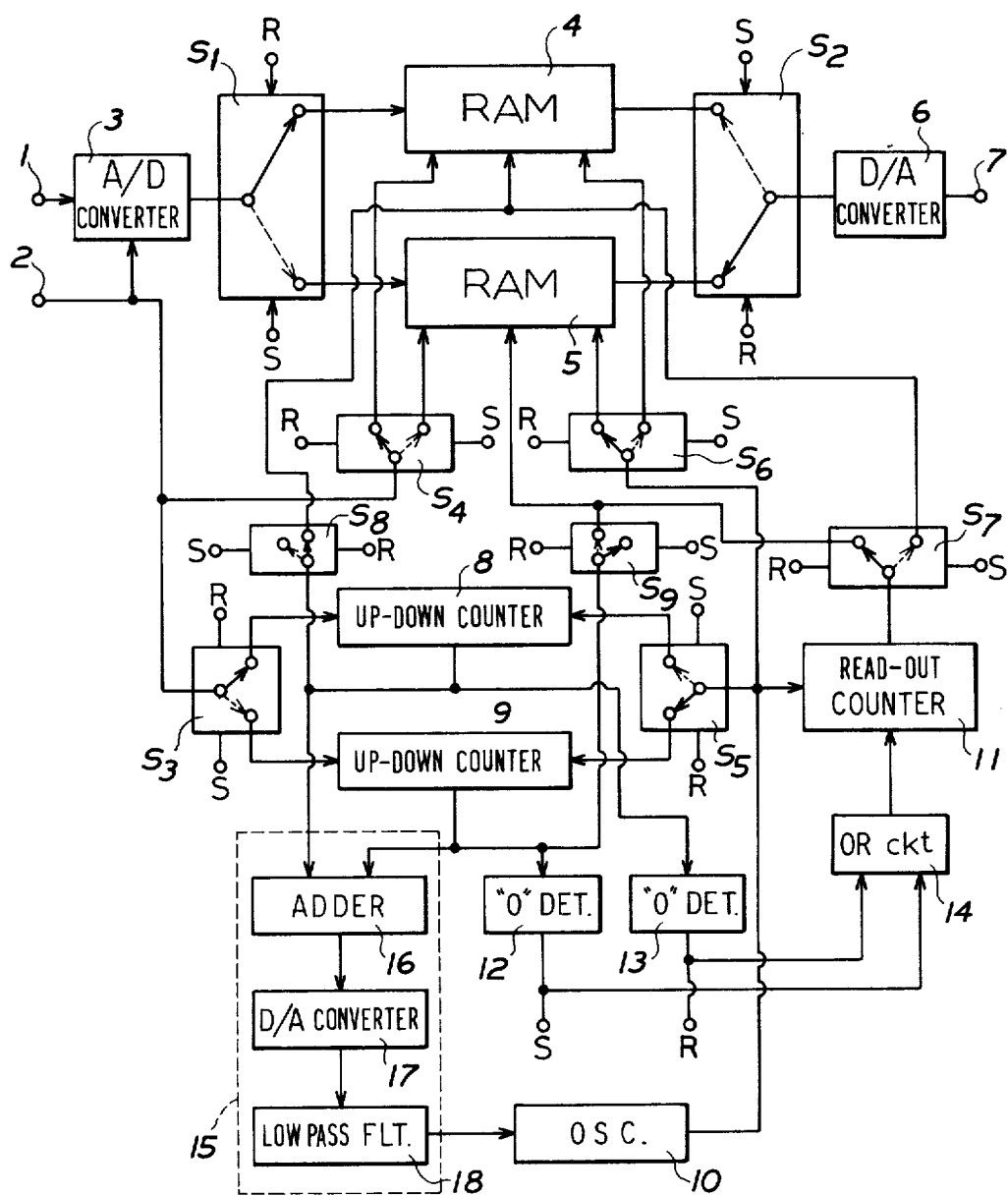
FIG. 2 is a schematic diagram showing the system of the present invention.

FIG. 1A shows the wave form of original signal and constant frequency pilot signal. In case the present invention is used for correction of playback signal of a tape recorder, the pilot signal is recorded simultaneously and on the same channel as original signal when the latter is recorded. The pilot signal and original signal can be recorded on separate channels if the tape skew effects are negligible.

FIG. 1B shows the wave form of the playback signal from the tape recorder and the playback pilot signal. These playback signal and playback pilot signal have the same time-base errors. The present invention is to provide an automatic time-base correction system for converting said playback signal into the original signal such as shown in FIG. 1A.

In FIG. 2, reference numeral 1 designates an input terminal to which the playback signal such as shown in FIG. 1B is supplied, the numeral 2 designates another input terminal to which the playback pilot signal having the waveform such as shown in FIG. 1B is supplied. Said input terminal 1 is connected to an analog-digital (A/D) converter 3, while said input terminal 2 is connected to a sampling terminal of siad A/D converter 3. The output of said A/D converter 3 is connected to the read-in terminals of the random access memories (RAM) 4 and 5 through a switch S1. The read-out terminals of each said RAM are connected to the output terminal 7 through a switch S2 and a digital-analog (D/A) converter 6.

The input terminal 2 is also connected to the up-terminals of the up-down counters 8 and 9 through a switch S3 and to the read-in clock terminals of RAM's 4 and 5 through a switch S4. The down terminals of said up-down counters 8 and 9 are connected through a switch S5 to the output of an oscillator 10 which generates the read-out clock at a uniform rate. The output of said oscillator 10 is connected to the input of a read-out counter 11 and to the read-out clock terminals of the RAM's 4 and 5 through a switch S6. The read-out address output of said read-out counter 11 is connected to the address input terminals of the RAM's 4 and 5 through a switch S7.

The read-in address outputs of said up-down counters 8 and 9 are connected to the address input terminals of the RAM's 4 and 5 through switches S8 and S9, respectively. The read-in address outputs of said up-down counters 8 and 9 are connected to an "OR" circuit 14 through "0" detectors 12 and 13. The output of said "OR" circuit 14 is connected to the reset terminal of the read-out counter 11. Although not shown, the set and reset signals S and R obtained from said respective "0" detectors 12 and 13 are connected to the set and reset terminals S and R of switches S1 - S9.

The control circuit 15 indicated by dotted line in FIG. 2 consists of an adder 16, a D/A converter 17 and a lowpass filter 18. The output of this circuit is connected to the frequency control terminal of the oscillator 10.

Now the operation of the system shown in FIG. 2 is described by having reference to FIG. 3, too. Since the control circuit 15, is a safety circuit as described later, the initial discussion excludes this portion.

If the switches S1 - S9 are connected as shown by solid lines, the digitalized signal obtained from the A/D converter 3 is fed to the RAM 4, while the read-in address signal from the up-down counter 8 is fed to the RAM 4, so that such signal is successively read in to a predetermined address. Such read-in is accomplished by the presence of the pilot signal supplied to the read-in clock terminal of the RAM 4. Initially, the up-down counter 8 counts up the pilot signal, and when its contents equal about half of the memory capacity of the RAM 4, switches S1 - S9 are reversed so that they are now connected as shown by dotted lines. The circuit formed thereby is not shown.

When the switches S1 - S9 are connected as shown by dotted lines, read-in of the digitalized signals is effected in the RAM 5 corresponding to the address signal of the up-down counter 9. On the other hand, the read-out counter 11 performs counting according to the read-out clock from the oscillator 10 to supply address signals to the RAM 4. Thus, the digitalized signals are read out from the RAM 4 at a uniform rate according to the period of the read-out clock are supplied to the D/A converter 6. Consequently, an output signal is generated at terminal 7 which is the same as the original signal such as shown in FIG. 1A and free of time-base error.

As read-out clock is supplied from the oscillator 10 during read-out of the RAM 4, the up-down counter 8 counts down, and when it reaches zero, the "0" detector 13 generates a rest signal, so that all of the switches S1 - S9 as well as read-out counter 11 are reset. Therefore, the digitalized signals are again read into RAM 4, while digitalized signals are read out from the RAM 5 successively from the address corresponding to the read-out address signal of the read-out counter 11. There is thus obtained from the output terminal 7 an output signal free of time-base error in continuation of the output of the RAM 4. During read-out of the RAM 5, the up-down counter 9 counts down, and when it reaches zero, the "0" detector 12 generates a set signal, whereby the switches S1 - S9 are set to form a circuit shown by dotted lines, and the above-said operation is repeated.

According to this system, read-in is practiced in one RAM unitl the other RAM, which is in read-out operation, completes its read-out. FIG. 3 diagrammatically shows the condition of storage of digitalized signals in two RAM's. When for instance the digitalized signals stored in the oblique-lined section of FIG. 3A are read out at a uniform rate up to the address Xj-1, read-in in the other RAM may proceed up to the address Xj as shown by the oblique-lined section of FIG. 3B, so that when the time-base error is large or when the errors continue, reading into one RAM may become impossible due to that RAM having become full before read-out from the other RAM is completed. Therefore, the number of storage locations in each RAM must be decided according to the size of the time-base error expected.

It is however, uneconomical to use the RAM's of too large capacity. Therefore, in case where no absolutely perfect time-base error correction is required, it is advisible to use a circuit shown as control circuit 15 in FIG. 2. In this case, the sum of address signals of the up-down counters 8 and 9 may be obtained by the adder 16 and supplied to the D/A converter 17 and lowpass filter 18 so that when the sum has become too large the oscillation frequency of the oscillator 10 is elevated, and when the sum has become too small said oscillation frequency is lowered.

In the above-described embodiment of the present invention, there were used in the RAM's of the type in which the digitalized signals are stored, but in case of using the RAM's capable of storing the analog signals, a sampling circuit is used instead of the A/D converters 3 and the D/A converter 6 is unnecessitated.

What is claimed is:
1. An automatic time-base error correction system comprising:
   a. means for providing an input analog signal and a pilot signal having the same time-base errors;
   b. random access memory means;
   c. read-in addressing means for generating a read-in address signal for said random access memory means having a variable rate in accordance with the rate of said pilot signal;
   d. means for digitalizing the input analog signal at a time specified by said pilot signal;
   e. means for coupling the digitalized signal to a data port of one of said random access memory means as well as means for applying said read-in address signal from one of said read-in addressing means to an address port of said one random access memory means;
   f. read-out clock means for generating read-out clock pulses;
   g. read-out addressing means for generating a read-out address signal having a rate in accordance with said read-out clock means;
   h. means for applying said read-out address signal to an address port of another of said random access memory means as well as means for applying said read-out clock means to said another random access memory means to cause data at a specified location to be read-out said another random access memory means;
   i. means for converting the output of said another random access memory means into analog form;
   j. control means for selecting one of said read-in addressing means to generate read-in addresses for said one of said random access memory means having further means operable to control when said read-out addressing means generates read-out addressess for said another random access memory means; and
   k. means to detect when said another random access memory means has had all data read-out and means to interchange read-in, read-out functions of said one random access memory means and said another random access memory means at that time.

2. The system according to claim 1, further including a variable frequency oscillator for generating said read-out clock pulses.

3. The system according to claim 2, further including means for changing the frequency of said oscillator based on the contents of said up-down counter means.

4. The system according to claim 1, wherein said read-in addressing means are comprised of up-down counter means.

5. The system according to claim 4, wherein when one of said up-down counter means is counting up said pilot signal, a second up-down counter means is being counted down by said read-out clock.

6. The system accordng to claim 5, further including a counter for generating said read-out address signal.

7. The system according to claim 6, wherein said read-out address counter is reset when the contents of either of said up-down counter means has become zero.

* * * * *